(12) United States Patent
Lowthert et al.

(10) Patent No.: US 7,519,273 B2
(45) Date of Patent: Apr. 14, 2009

(54) CONTENT WITH ADVERTISEMENT INFORMATION SEGMENT

(75) Inventors: Jonathan E. Lowthert, Sunnyvale, CA (US); Oleg Rashkovskiy, Cupertino, CA (US)

(73) Assignee: Blackarrow, Inc., San Mateo, CA (US)

( * ) Notice: Subject to any disclaimer, the term of this patent is extended or adjusted under 35 U.S.C. 154(b) by 1476 days.

(21) Appl. No.: 09/766,126

(22) Filed: Jan. 19, 2001

(65) Prior Publication Data

US 2002/0097979 A1    Jul. 25, 2002

(51) Int. Cl.
*H04N 5/91* (2006.01)
(52) U.S. Cl. .............................. 386/95; 386/125; 725/34
(58) Field of Classification Search .................. 386/46, 386/95, 125, 126; 725/34, 36; 705/14
See application file for complete search history.

(56) References Cited

U.S. PATENT DOCUMENTS

| | | | | |
|---|---|---|---|---|
| 3,594,732 A | 7/1971 | Mendelson et al. | ......... | 710/269 |
| 4,390,904 A | 6/1983 | Johnston et al. | ............... | 386/53 |
| 5,585,858 A | 12/1996 | Harper et al. | ............... | 348/485 |
| 5,586,264 A | 12/1996 | Belknap et al. | ............. | 725/115 |
| 5,600,364 A | 2/1997 | Hendricks | ....................... | 348/1 |
| 5,697,844 A | 12/1997 | Von Kohorn | ................. | 463/40 |
| 5,724,521 A | 3/1998 | Dedrick | ........................ | 705/26 |
| 5,774,664 A | 6/1998 | Hidary et al. | ............... | 725/110 |
| 5,815,671 A * | 9/1998 | Morrison | .................... | 709/247 |
| 5,851,149 A | 12/1998 | Xidos et al. | .................... | 463/42 |
| 5,886,731 A * | 3/1999 | Ebisawa | ....................... | 725/32 |
| 5,912,696 A | 6/1999 | Buehl | ........................ | 348/5.5 |
| 5,913,040 A * | 6/1999 | Rakavy et al. | ............... | 709/232 |
| 5,970,143 A | 10/1999 | Schneier et al. | ............. | 713/181 |
| 6,002,393 A | 12/1999 | Hite et al. | .................... | 345/327 |
| 6,006,257 A | 12/1999 | Slezak | ......................... | 709/219 |
| 6,029,045 A | 2/2000 | Picco et al. | ................... | 455/5.1 |
| 6,076,166 A | 6/2000 | Moshfeghi et al. | ............. | 726/4 |
| 6,088,455 A | 7/2000 | Logan et al. | ................. | 380/200 |
| 6,182,050 B1 | 1/2001 | Ballard | ........................ | 705/14 |
| 6,216,112 B1 | 4/2001 | Fuller et al. | .................... | 705/14 |
| 6,240,555 B1 * | 5/2001 | Shoff et al. | .................. | 725/110 |

(Continued)

FOREIGN PATENT DOCUMENTS

GB        2141907 A    *    1/1995

OTHER PUBLICATIONS

Rashkovskiy, Oleg B., U.S. Appl. No. 09/561,443, filed Apr. 28, 2000, entitled "Providing Content Interruptions".

(Continued)

*Primary Examiner*—Huy T Nguyen
(74) *Attorney, Agent, or Firm*—Trop, Pruner & Hu, P.C.

(57) ABSTRACT

A data delivery mechanism, such as a recordable disk or packets on a wire, delivering an info segment which specifies interruption points at which a first content item such as a television program is to be interrupted and a second content item such as an advertisement is to be inserted. The info segment may prevent certain types of second content items from being utilized, may permit them to be avoided, may control their duration, and other aspects of their utilization. The info segment may specify with which first content item it is associated. Other embodiments are also disclosed and claimed, such as an electronic programming guide.

14 Claims, 6 Drawing Sheets

U.S. PATENT DOCUMENTS

| | | |
|---|---|---|
| 6,357,042 B2 | 3/2002 | Srinivasan et al. ............ 725/32 |
| 6,425,127 B1 | 7/2002 | Bates et al. .................... 725/32 |
| 6,434,747 B1 | 8/2002 | Khoo et al. .................... 725/46 |
| 6,446,261 B1 | 9/2002 | Rosser ........................ 725/34 |
| 6,532,591 B1 | 3/2003 | Arai et al. .................... 725/132 |
| 6,616,533 B1 | 9/2003 | Rashkovskiy ................. 463/31 |
| 6,698,020 B1 * | 2/2004 | Zigmond et al. .............. 725/34 |
| 6,721,955 B2 | 4/2004 | Khoo et al. .................... 725/46 |
| 6,725,203 B1 * | 4/2004 | Seet et al. ..................... 705/14 |
| 6,769,127 B1 | 7/2004 | Bonomi et al. ................ 725/39 |
| 6,912,504 B1 | 6/2005 | Rashkovskiy ................. 705/14 |
| 6,961,430 B1 | 11/2005 | Gaske et al. ................. 380/216 |
| 6,971,119 B1 | 11/2005 | Arsenault et al. ............. 725/89 |
| 7,039,932 B2 | 5/2006 | Eldering ....................... 725/35 |
| 7,051,351 B2 * | 5/2006 | Goldman et al. ............. 725/34 |
| 2001/0004768 A1 | 6/2001 | Hodge et al. ................. 725/91 |
| 2001/0013123 A1 | 8/2001 | Freeman et al. .............. 725/34 |
| 2001/0042249 A1 | 11/2001 | Knepper et al. .............. 725/42 |
| 2002/0073421 A1 | 6/2002 | Levitan et al. ............... 725/28 |
| 2002/0078443 A1 | 6/2002 | Gadkari |
| 2002/0095674 A1 | 7/2002 | Lowthert et al. ............. 725/32 |
| 2002/0095675 A1 | 7/2002 | Lowthert et al. ............. 725/34 |
| 2002/0097979 A1 | 7/2002 | Lowthert et al. ............. 386/46 |
| 2002/0100043 A1 | 7/2002 | Lowthert et al. |
| 2002/0100062 A1 | 7/2002 | Lowthert et al. |
| 2002/0120931 A1 | 8/2002 | Huber et al. .................. 725/34 |
| 2003/0026424 A1 | 2/2003 | McGarrahan et al. ....... 380/255 |
| 2004/0015986 A1 | 1/2004 | Carver et al. |
| 2004/0168189 A1 | 8/2004 | Reynolds |

OTHER PUBLICATIONS

Rashkovskiy, Oleg B., U.S. Appl. No. 09/690,159, filed Oct. 17, 2000, entitled "Providing Content Interruptions".

Rashkovskiy, Oleg B., U.S. Appl. No. 09/690,549, filed Oct. 17, 2000, "Storing Advertisements".

Rashkovskiy, Oleg B., et al., U.S. Appl. No. 09/706,501, filed Nov. 2, 2000, "Content Protection Using Block Recording".

Microsoft Press Computer Dictionary, 3rd edition, 1997, p. 433.

Information Technology—Generic Coding of Moving Pictures and Associated Audio Information, Part 2: Video, Draft International Standard, ISO/IEC DIS 13818-2.

Microsoft Press Computer Dictionary, 3rd edition 1997, p. 433.

* cited by examiner

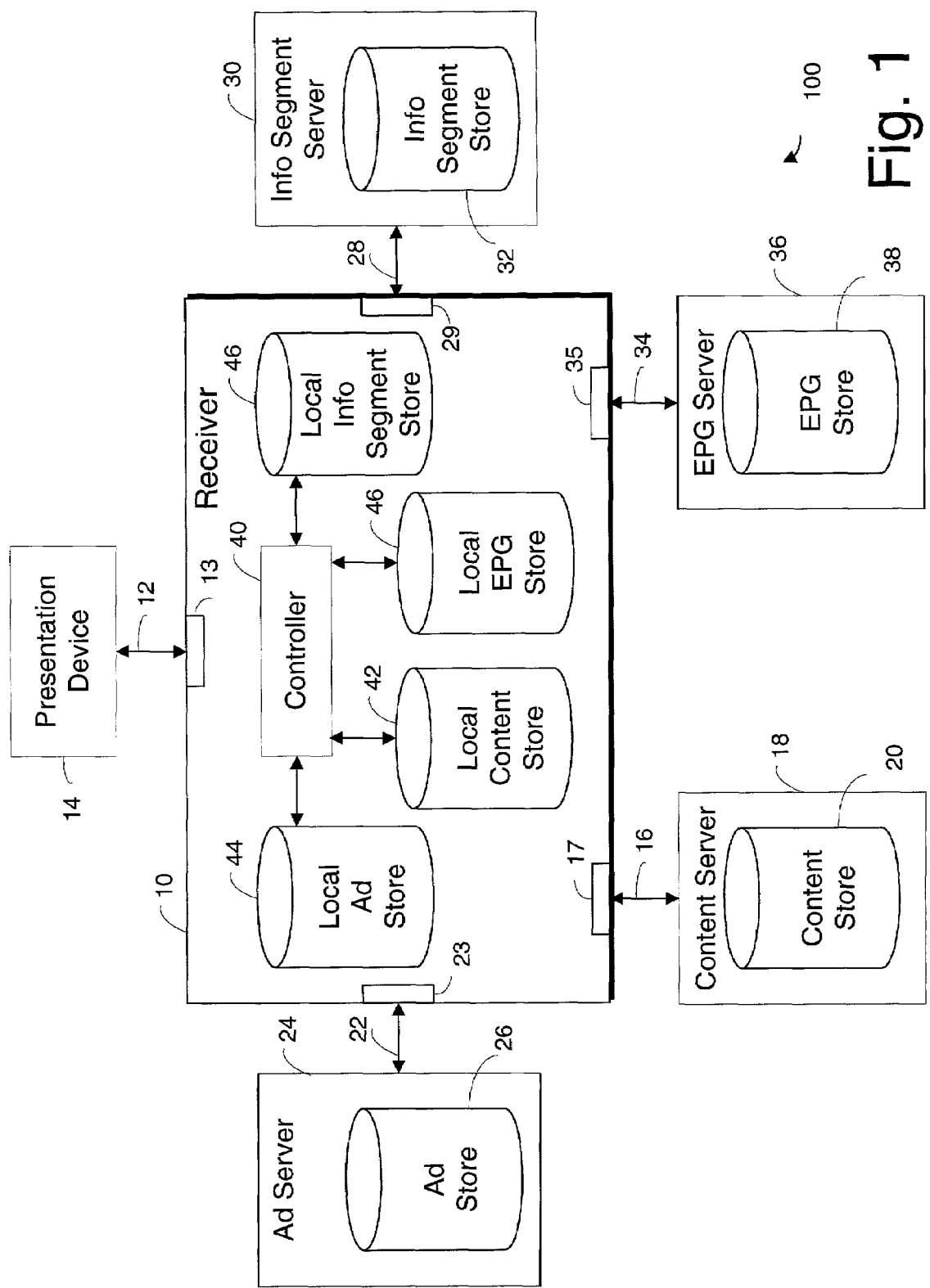

US 7,519,273 B2

CONTENT WITH ADVERTISEMENT INFORMATION SEGMENT

RELATED APPLICATIONS

This application is related to U.S. patent application Ser. No. 09/766,125, entitled "Content With Advertisement Information Segment" and U.S. patent application Ser. No. 09/766,133 entitled "Content With Advertisement Information Segment" which were filed on Jan. 19, 2001, by these inventors and assigned to the same entity.

BACKGROUND OF THE INVENTION

1. Technical Field of the Invention

The present invention relates generally to insertion of advertisements or the like into content such as a movie.

2. Background Art

In present content distribution systems, advertisements are permanently, directly attached to the content with which they are distributed, on the same distribution medium. Rental video tapes typically contain several advertisements at the beginning of the tape, before the movie content begins. In general, the content itself will have a much longer "shelf life" than the advertisements. For example, consider a videotape or DVD copy of a highly successful motion picture, with a commercial at the beginning of the tape or DVD advertising a different movie which had not yet reached theaters at the time the tape was originally released, and which may thereafter have proven to be a complete flop. That videotape or DVD may be rented for dozens of years to come, with the now-pointless advertisement playing each time. As another example, consider a home videotape copy of a Superbowl football game, during which were shown: a commercial for a new model automobile, a commercial for a limited-time home mortgage offer, and a commercial for an after-Christmas furniture sale. Those commercials become useless quickly, in some cases in mere days.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 1 shows one embodiment of a system constructed according to the principles of this invention.

DETAILED DESCRIPTION

Figure 5:
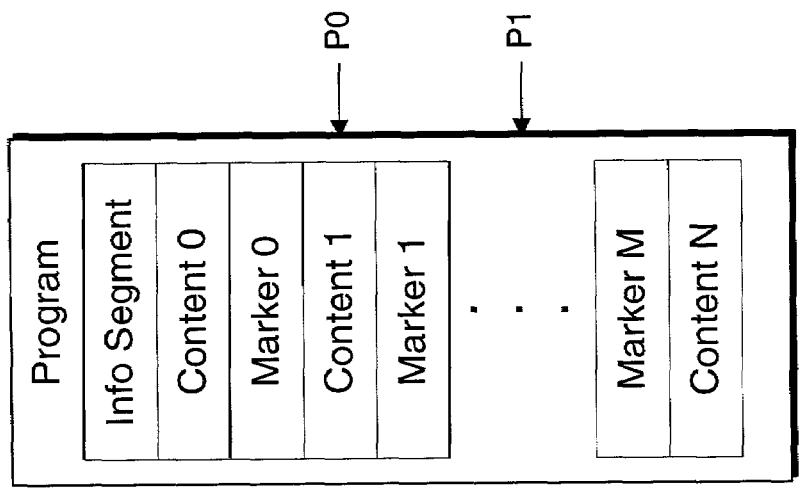
FIG. 5 shows another embodiment of a program which includes such an info segment used in conjunction with a content item which includes markers.

FIG. 1 illustrates one embodiment of a system 5 constructed according to the principles of this invention. The system includes a receiver 10 which is coupled over a presentation link 12 at a presentation device port 13 to a presentation device 14. In various embodiments, the presentation device may be an audio speaker, a video screen, an audio-visual combination device, or other suitable apparatus over which a user may enjoy content such as entertainment programming. The presentation link may be a wire, a wireless connection, an infrared connection, or any other suitable communications mechanism. The port may be any form of suitable connection means.

The receiver is further coupled over a content link 16 at a content port 17 to a content server 18 which includes a content store 20. The content server may be, for example, a television broadcast station, a television cable head-end, a website, a movie production house, or any other producer or provider of user-consumable content, such as entertainment programming, television shows, movies, or the like.

The receiver is also coupled over an ad link 22 at an ad port 23 to an ad server 24 which includes an ad store 26. The ad link, ad server, and ad store will be discussed in terms of storing and delivering advertising content, but the skilled reader will understand that the teachings of this invention may be utilized in providing other types of content which is to interrupt the primary content from the content store. Examples of such other types of content may include digital gift certificates, hyperlinks, links to ATVEF presentations, questionnaires, or other content.

The receiver is further coupled over an info segment link 28 at an info segment port 29 to an info segment server 30 which includes an info segment store 32.

The receiver may also optionally be coupled over an electronic programming guide (EPG) link 34 at an EPG port 35 to an EPG server 36 which includes an EPG store 38.

The content link, ad link, info segment link, and EPG link may each be a wire, a wireless broadcast mechanism, a coaxial cable system, a laser point-to-point link, the internet, a modem, a satellite dish network, a CD-ROM or DVD or the like, "sneakernet", or other suitable delivery means. They may all be carried on a common link, or each may be a separate and different type of link, or any combination thereof.

The receiver 10 includes a controller 40 which governs the operation of the receiver. To the controller are coupled a local content store 42, a local ad store 44, a local info segment store 46, and an optional local EPG store 48. In some embodiments, these local stores may be constructed as separate storage elements, while in other embodiments, various combinations of them may be constructed to share a common storage element. The storage element(s) may utilize videotape, digital videotape, hard disk, CD-R, CD-RW, DVD-R, semiconductor memory, or any other suitable storage mechanism(s).

Various ones of the various ports and links may, in some embodiments, be internal to the receiver. In some embodiments, there may be more than one of each port and link. In some embodiments, various of the links may be combined.

The phrase "server" is used by way of illustration. The skilled reader will appreciate that the principles of this invention are not limited to a server-client implementation model.

Please make continued reference to FIG. 1 throughout the following explanation.

Figure 2:
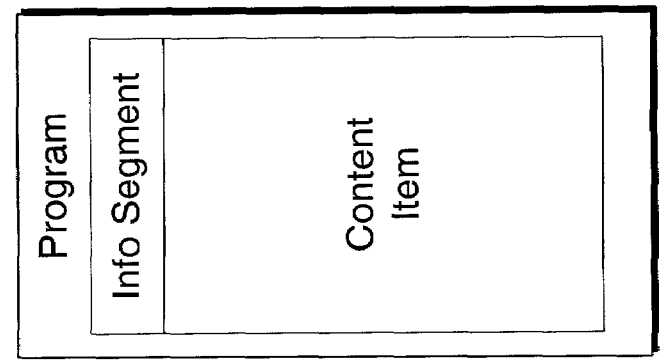
FIG. 2 shows one embodiment of a program which includes a content item and an info segment.

FIG. 2 illustrates one embodiment of a program which includes an info segment and a content item. The info segment is provided to the receiver by the info segment server, and the content item is provided to the receiver by the content server. FIG. 2 may be understood to represent a data stream which contains the info segment and the content item. FIG. 2 may also be understood to represent a recording mechanism upon which are recorded the info segment and the content item. The reader will appreciate that there is not any order implied in the representation, and that the info segment could be recorded or transmitted at the start, at the end, in the middle, in a unitary block, scattered in pieces throughout the content item, as a single instance, as repeated instances, and so forth.

Figure 3:
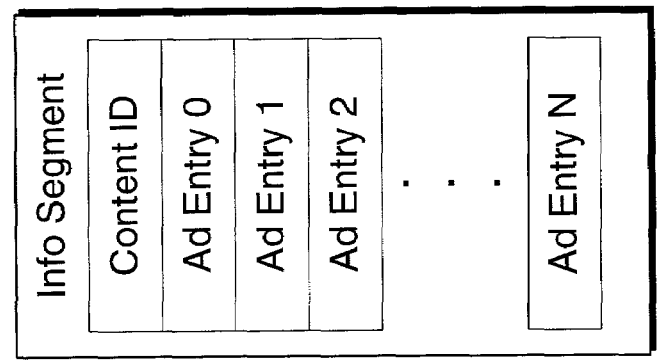
FIG. 3 shows the contents of one embodiment of an info segment such as may be used in practicing this invention.

FIG. 3 illustrates one exemplary embodiment of an info segment which may be provided over the info segment link from the info segment server. In some embodiments of the program of FIG. 2, there may be an implicit association between the info segment header and the content item. For example, if the program is provided on a videotape which contains only a single movie—the content item—there will be a single info segment for that movie. In such a case, the content identifier may be regarded as null. The null content identifier may be one that is ignored, or there may simply not be one. In other embodiments, in which the association between the info segment and the content item is not implicit, the info segment will contain a non-null content identifier (Content ID) which specifies with which content item the info segment is associated. In one embodiment, the content identifier may be, for example, a copy of (or a hashed value of) an initial portion of closed caption text in the content item. In another embodiment, the content identifier may be a programming guide reference number of the program, such as a VCR+number. Other associative mechanisms will be apparent to the reader upon studying this disclosure.

The info segment also contains one or more ad entries (Ad Entry 0-N), which may be stored in any suitable manner, such as a table, a linked list, or the like. The various fields of a given ad entry may be stored contiguously together, or like fields of the multiple ad entries may be stored together.

Figure 4:
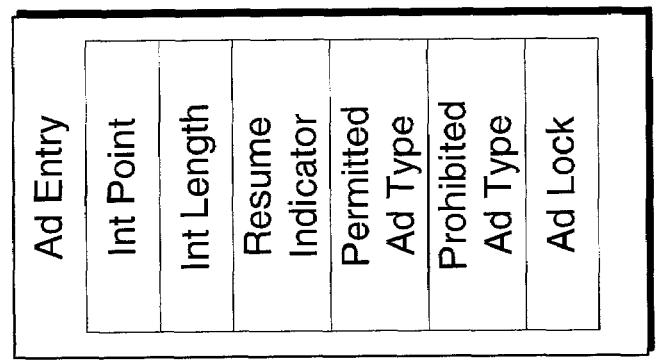
FIG. 4 shows the contents of one embodiment of an ad entry such as may be used in such an info segment.

FIG. 4 illustrates the contents of an exemplary ad entry. In various embodiments, various ones of the fields in an ad entry may be optional, as suitable for the implementation. In some embodiments, the ad entry may contain an interrupt point identification (Int Point) which indicates a point during the content item at which an advertisement should be inserted, interrupting the play of the content item. In some embodiments, play of the content item should be suspended until the advertisement is done. In other embodiments, play of the content item may continue during the advertisement; in such embodiments, the "interruption point" is really an "insertion point". The interrupt point identification may specify the interruption point in any of a variety of fashions. In one embodiment, it may indicate a time, relative to the start of the content item, at which the ad should be inserted; e.g. "play commercial fifteen minutes into the movie". In another embodiment, it may indicate a time relative to a most-recently-inserted advertisement; e.g. "play commercial ten minutes after the prior commercial". In another embodiment, some metric other than time could be used, such as a byte or block count; e.g. "play commercial after one million blocks of the movie have been decoded and played". In yet another embodiment, the interrupt point identification may specify a content-specific event such as "when the volume goes to zero, play a commercial" or "when there are two consecutive frames of all black, play a commercial" or the like. In yet another embodiment, the interrupt point identification may specify a play-specific factor such as "after the song has been played three times in one month, play a commercial".

In some embodiments, the ad entry may include an interrupt length (Int Length) specifier of how long the commercial is; e.g. "at this point, insert a thirty-second-long commercial". A variant of that is "play a commercial, but if it tries to run longer than thirty seconds, cut it off and return to the content".

In some embodiments, the ad entry may include a resume indicator (Resume Indicator) which may further control the ability of the interrupting advertisement to seize undue control over the playing of the primary content item. One such resume indicator may be, for example, "insert a commercial, but allow the user to override it by hitting the <enter> button on the remote control". One commercially interesting variant of this might be "insert a commercial, but terminate it if the user hits the <payment> button" upon which some nominal fee may be automatically charged to the user's predetermined account. Fees from such payments could be divided between the content provider and the advertiser.

The ad entry may further include, in some embodiments, a permitted ad type identifier (Permitted Ad Type) and/or a prohibited ad type identifier (Prohibited Ad Type) which, when taken together or alone, may impose limitations upon the type, rating, source, content, or other aspect of advertisement which is allowed by the content provider, the advertiser, and/or the user to be inserted at the specified point. For example, Disney may not want its movies to be interrupted with advertisements which contain nudity. Similarly, Marlboro may wish to prevent its advertisements from being shown during any children's television program. Or a parent may wish to prevent any advertisements containing profanity, or advertising alcoholic beverages, from being played in their home at any time.

The ad entry may also include additional fields to control various additional aspects of the content/advertisement/audience relationship. As one example, the ad entry may include an ad lock (Ad Lock) field which serves as an override to the interruption by the advertisement. In one embodiment, the ad lock field may be used to cause an advertisement to be played if the user has only rented the videotape, but to skip the advertisement if the user has purchased the videotape. Other uses or heuristics are of course conceivable. For example, the ad lock may permit suppression of the commercial if the time is after ten o'clock at night, or if the user has already viewed twenty-five commercials that day, and so forth.

It is not necessarily required that all ad entries in a given info segment contain exactly the same fields. For example, one ad entry may lack a permitted ad type specifier, while another ad entry in the same info segment may lack an ad lock, while yet another may lack everything but the interrupt point identifier. If it is desired that all ad entries be the same size, then the unused fields may simply be left blank, or they may be filled with some predetermined value indicating nonuse. In other embodiments, it may be desirable to minimize the size of the info segment, and, in such cases, it may be suitable to permit ad entries of different sizes, so unused fields do not occupy any bytes.

FIG. 5 illustrates an alternative embodiment of the program, in which the content item is not stored as a contiguous block, but is stored in separate blocks (Content 0-N) between which are interlaced one or more markers (Marker 0-M). In such an embodiment, rather than specifying specific offset times for commercial insertion, the info segment may instead specify that commercials should be inserted at markers. For example, if a viewer tunes in when the content broadcast has already progressed to point P0, the slot (Marker 0) for the first commercial has already passed. Rather than selling "the ad slot at time 15:00 into the broadcast" to the advertiser, it may be desirable to sell "the first ad slot that any given viewer encounters". In this case, the first commercial will be inserted at the first slot (Marker 1) which this particular viewer encounters, rather than the slot (Marker 0) which has already passed. The reader will appreciate that this business model can be practiced without insertion of such markers; but that markers may be one advantageous embodiment.

Figure 6:
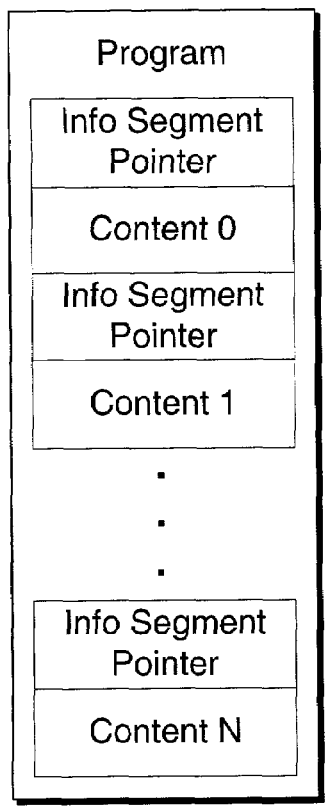
FIG. 6 shows another embodiment of a program which includes a content item and info segment pointers which point to such an info segment.

FIG. 6 illustrates another alternative embodiment of the program, in which the info segment is not actually inserted into the program. In the embodiment illustrated by FIG. 5, it was assumed that the info segment had been captured by the receiver, either at the time it was originally broadcast (even though the viewer had not yet tuned in that particular broadcast), or immediately when the viewer tuned in that program. This may not always be practical, in some cases due to the size o the info segment and the limited storage provided in the receiver. As illustrated in FIG. 6, the program may contain info segment pointers (Info Segment Pointer), such as URLs or the like, which take far less bandwidth and storage than the complete info segment. Thus, the pointers may be repeated periodically throughout the broadcast of the content item. The first time the receiver encounters a pointer, it may fetch the info segment.

Figure 7:
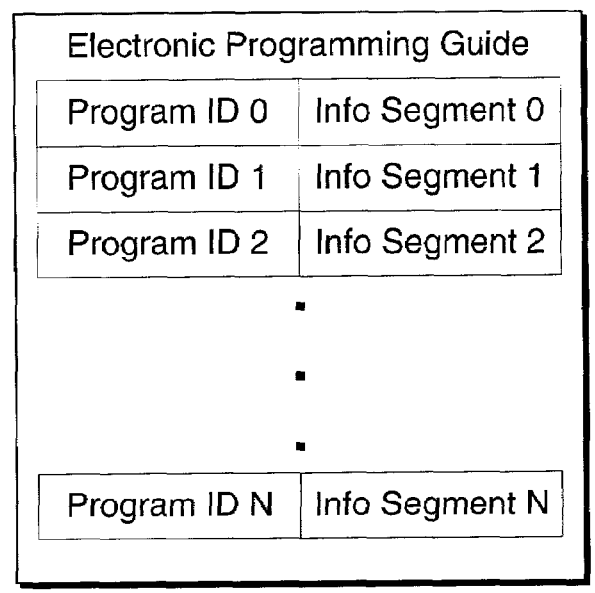
FIG. 7 shows an electronic programming guide which includes info segments for the respectively associated content items.

FIG. 7 illustrates an electronic programming guide (EPG) as modified for use with this invention. The EPG includes one or more program identifiers (Program ID 0-N), each of which provides programming guide information for a particular program, such as channel, start time, ending time, a textual or other listing of its stars and director, and so forth. Associated with each of one or more of the program identifiers is an info segment (Info Segment 0-N) which provides the mapping of advertisements for the associated program.

Figure 8:
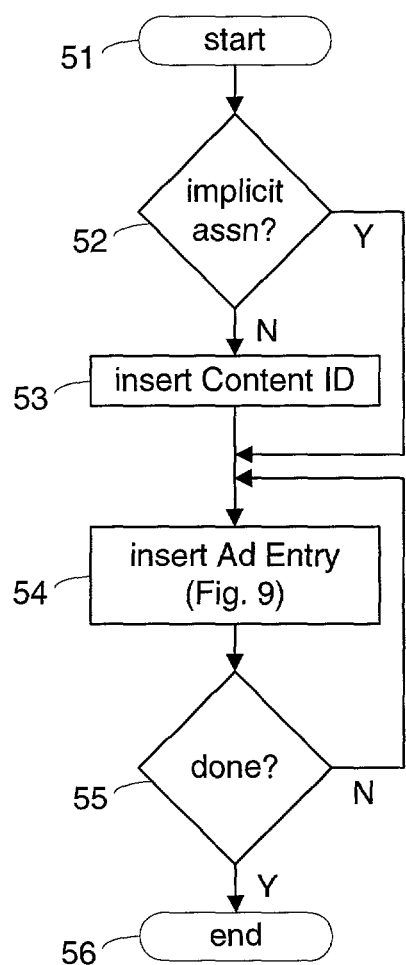
FIG. 8 shows one embodiment of a method for generating an info segment such as that shown in FIG. 3.

FIG. 8 illustrates one embodiment of a method for generating an info segment, and should be read in conjunction with FIG. 3. The method begins at a starting point (51). If (52) there is an implicit association between the info segment and the content item to which it pertains, then the method may optionally skip the insertion (53) of the content identifier (Content ID). Then, the method inserts (54) at least one ad entry (Ad Entry 0). If (55) there are more ad entries to be inserted, then the method iterates through the insertion (54) of the ad entries until there are no more to be inserted. Then the method is finished (56). The reader will appreciate that an info segment may be ordered, structured, formatted, protected, encrypted, compressed, and so forth, according to the needs of the application.

Figure 9:
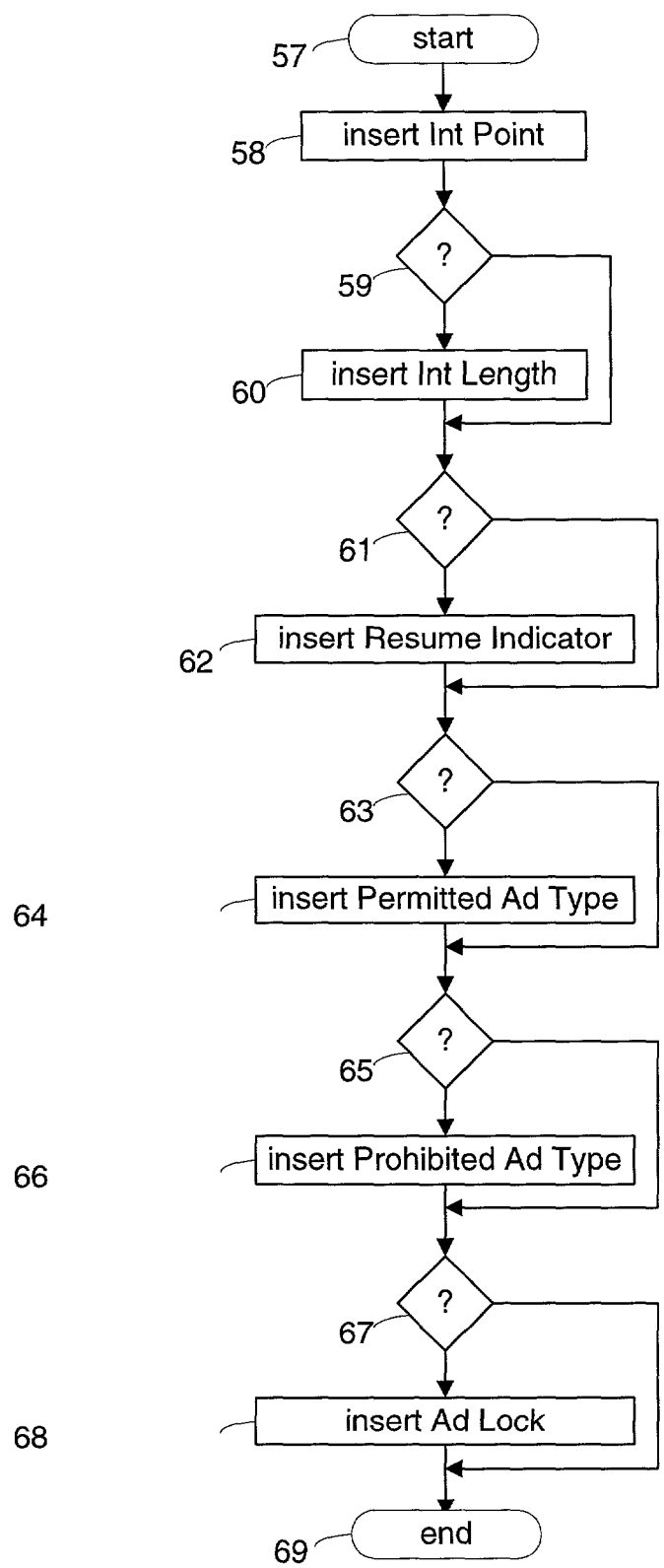
FIG. 9 shows one embodiment of a method for generating an ad entry such as that shown in FIG. 4.

FIG. 9 illustrates one embodiment of a method for generating an ad entry, and should be read in conjunction with FIG. 4. The method shown in FIG. 9 may be utilized to perform the insertion of the ad entry, in FIG. 8. The method begins at a starting point (57). In embodiments where it is required, the method inserts (58) an interrupt point identification (Int Point). If (59) it is required, the method inserts (60) an interrupt length specifier. If (61) it is required, the method inserts (62) a resume indicator. If (63) it is required, the method inserts (64) a permitted ad type identifier. If (65) it is required, the method inserts (66) a prohibited ad type identifier. If (67) it is required, the method inserts (68) an ad lock. Finally, the method ends (69). The reader will appreciate that an ad entry may be ordered, structured, formatted, protected, encrypted, compressed, and so forth, according to the needs of the application.

Figure 10:
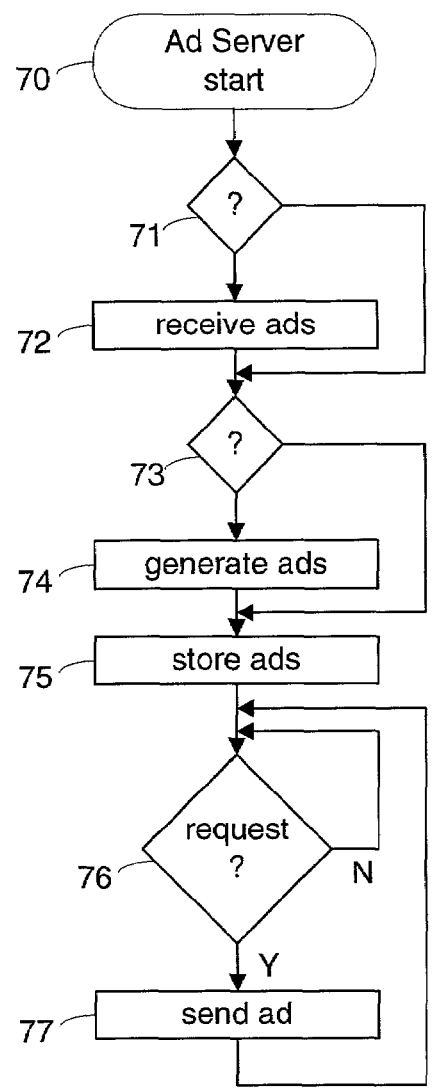
FIG. 10 shows one embodiment of a method for operating an ad server such as that shown in FIG. 1.

FIG. 10 illustrates one embodiment of a method for operating an Ad Server such as that shown in FIG. 1. The method begins at a starting point (70). The ad server may optionally (71) receive ads (72) from external sources. The ad server may also optionally (73) generate ads (74) itself. The ad server stores the ads in an ad store. In a "pull" model, the ad server waits (76) for requests for ads, then retrieves those ads from the ad store (or it could even generate or fetch them on the fly), and sends the ads (77) to the requester over an ad link. The ad server then returns to wait for additional requests. In a "push" model, the ad server would not wait for requests, but would proactively deliver ads without waiting for requests.

Figure 11:
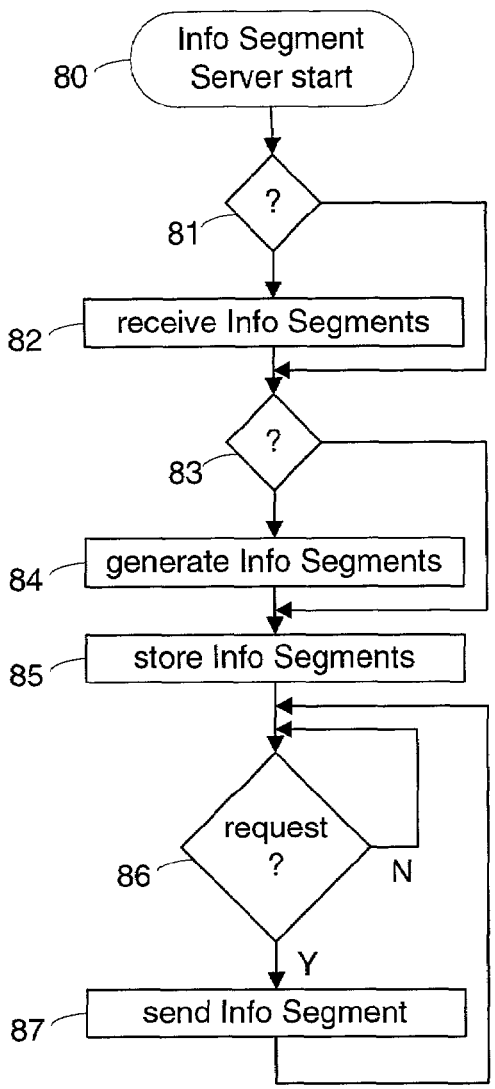
FIG. 11 shows one embodiment of a method for operating an info segment server such as that shown in FIG. 1.

FIG. 11 illustrates one embodiment of a method for operating an Info Segment Server such as that shown in FIG. 1. The method begins at a starting point (80). The info segment server may optionally (81) receive info segments (82) from external sources. The info segment server may also optionally (83) generate info segments (84) itself. The info segment server stores the info segments in an info segment store. In a "pull" model, the info segment server waits (86) for requests for info segments, then retrieves those info segments from the info segment store (or it could even generate or fetch them on the fly), and sends the info segments (77) to the requester over an info segment link. The info segment server then returns to wait for additional requests. In a "push" model, the info segment server would not wait for requests, but would proactively deliver info segments without waiting for requests.

Figure 12:
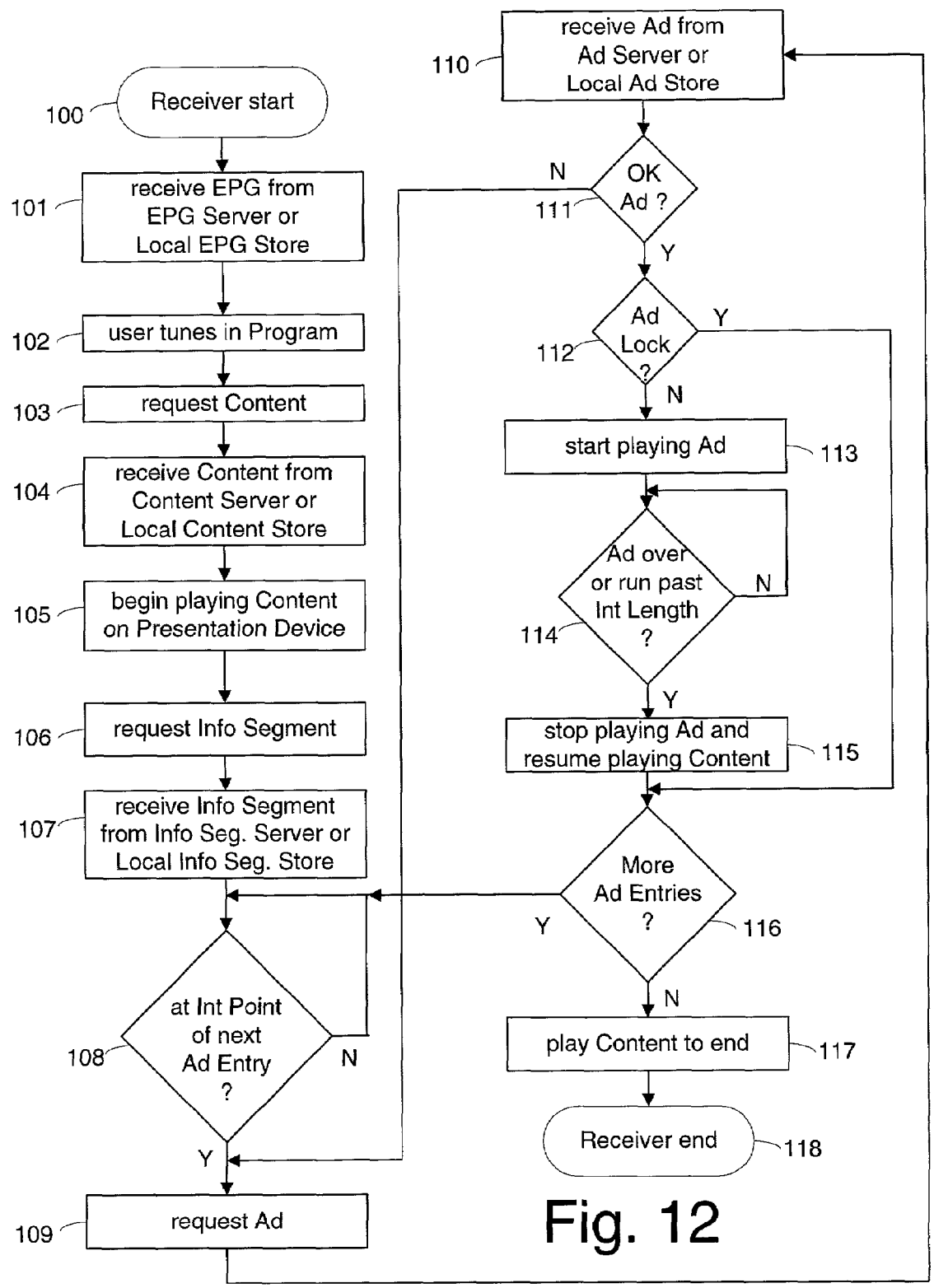
FIG. 12 shows one embodiment of a method for operating a receiver such as that shown in FIG. 1.

FIG. 12 illustrates one embodiment of a method for operating a Receiver such as that shown in FIG. 1, to which the reader should refer. The method begins at a starting point (100). The Receiver may receive (101) an electronic programming guide (EPG) from an EPG Server, or from the Local EPG Store if it has previously been received and cached. This may be done in the background, without direct user input. The user tunes in (102) a program, or the Receiver may do this automatically, such as if the user has programmed the Receiver to always tune in a particular program. The Receiver requests (103) content for that program, and then receives (104) the content from the Content Server or from the Local Content Store if it has previously been received and cached. The Receiver begins to play (105) the content on the Presentation Device. The Receiver requests (106) an info segment for that program, and receives (107) the info segment from the Info Segment Server, or from the Local Info Segment Store if it has previously been received and cached; in that case, it may then also check to see if the locally stored info segment is still valid or current.

During play of the content, the receiver waits (108) until play reaches the first interruption point identified in the info segment. At that point, the receiver requests (109) an ad, and receives (110) the ad from the Ad Server or from the Local Ad Store if the ad has previously been received and cached. If (111) the ad and content do not, together, meet the criteria specified by the Permitted Ad Type and Prohibited Ad Type specifiers, the Receiver requests (109) another ad. If (112) the Ad Lock indicator says to this ad may not be skipped, or the requisite conditions are met for skipping the ad, then the Receiver interrupts play of the content and begins (113) playing the ad instead. If (114) the ad runs longer than permitted by the Int Length specifier, or the ad ends, the Receiver stops (115) playing the ad and resumes playing the content. If (116) there are more ad entries, control returns to wait for the next interruption point (108). If (112) the Ad Lock indicator permits the ad to be skipped, and if the requisite conditions are met, no ad will be played, and the method will check (116) if there are more ad entries; in such a case, it may be that the Receiver should play the already-retrieved ad rather than fetching a new one, at the next interruption point. Ultimately, the content is played (117) to its end and the method finishes (118).

The reader should appreciate that FIGS. 8-12 each represents both a process for performing a respective method, as well as a recordable medium or other instruction delivery mechanism in which is encoded or recorded or otherwise represented a series of instructions, routines, firmware, or control codes or the like which, when executed by a computer device or loaded as firmware or control codes into a programmable hardware device or provided as inputs to a runtime interpreter or the like, cause such hardware or software to perform the respective method. The reader should also appreciate that FIGS. 2-7 each represents both a respective data entity and a recordable medium or other data delivery mechanism in which is encoded or recorded or otherwise represented that data entity. Instruction and data delivery mechanisms (and the various links described above) include, but are not limited to: magnetic tape, optical discs, DVD, DVD-R, DVD-RW, CD, CD-ROM, CD-R, CD-RW, floppy disk, hard drive, removable hard drive, semiconductor memory device, and the like, as well as down-the-wire, over-the-airwaves, wireless packet, cable television signal, laser-carried, internet protocol delivery, and other such forms of delivery mechanism.

The reader should appreciate that, while the invention has been described with reference to the interruption of a first content item for the playing of a second content item which has been described above as being an advertisement, it is not necessary that the second content be a commercial advertisement. The invention may be used in interrupting any type of first content item for the play of any type of second content item. The content items may be video, audio, audio/video, text, or any other suitable form of data. The receiver may, in some embodiments, contain an integral presentation device. In others, the presentation device may be external. The invention may readily be utilized in a wide variety of applications; for example, the receiver may be a DVD player, a CD player, a video player, an audio player, an e-book viewer, or any other suitable device.

Finally, the reader should appreciate that in various embodiments of the system, various of the servers' functions may be performed by a single, combined entity. For example, the ad server and the info segment server could be a single server, or the content server and the info segment server could be built as a single entity, or all four servers could share a common platform, and so forth.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A computer-readable medium storing instructions that are executed by a computer to enable the computer to:
   receive and store an advertisement, a plurality of segments of one particular program, and at least one segment pointer interlaced between the segments of the one particular program, said at least one segment pointer to link to a remotely located info segment and other than said info segment; and
   in response to detecting a segment pointer between segments of the plurality of segments of said one particular program, said computer to retrieve said info segment from a remote storage, said retrieval of said info segment separate from and not coinciding with the receipt of segments of the plurality of segments of said one particular program or an advertisement, said info segment including,
      a content identifier to indicate that said info segment is to be associated with the one particular program, and
      a plurality of entries, each entry specifying,
         an interruption point to identify a condition that, if detected, will cause the display of an advertisement to replace the display of the one particular program, and
         one or more conditions controlling the interruption.

2. The computer-readable medium of claim 1 wherein the one or more conditions comprise:
   whether a user can override insertion of a commercial;
   whether a particular type of commercial is allowed to be played at the interruption point; and
   whether a commercial can be skipped by virtue of a financial payment.

3. A computer-readable medium storing instructions that are executed by a computer to enable the computer to:
   receive an electronic programming guide having a plurality of program identifications within said electronic programming guide;
   receive a plurality of info segments and associate, in said guide, an info segment with each of a predetermined one of the plurality of program identifications, each info segment including,
      a program identification to enable the association of the info segment with a the predetermined one of the plurality of program identifications, and
      a plurality of interruption point specifiers to identify a condition that, if satisfied during play of a program selected from said guide, will cause the computer to display an advertisement instead of the identified program, the timing of the occurrence of the condition, if the condition occurs at all, unknown at the time the info segment is associated with a predetermined one of the plurality of program identifications; and
   access a particular info segment through said electronic programming guide in response to user selection of a program from the electronic program guide to which the particular info segment is directed.

4. The computer-readable medium of claim 3 wherein:
   at least one of the info segments represented therein further includes a maximum interruption length specifier;

at least one of the info segments represented therein further includes a permitted ad type specifier;

at least one of the info segments represented therein further includes a prohibited ad type specifier; and at least one of the info segments represented therein further includes an ad lock specifier.

5. A method comprising:

receiving, on a receiver, and storing, in a cache coupled to said receiver, a particular content item, said particular content item stored for repeated access by a user at any time, said receiver also storing an info segment including a unique content identifier to associate said info segment with said particular content item and an interrupt point specifier to identify a condition that, if detected, will cause said receiver to replace the display of said particular content item with the display of an advertisement, the timing of the occurrence of the condition, if the condition occurs at all, unknown at the time of content access and unique to each access of said content;

associating said info segment and said particular content item identified by said unique content identifier while said particular content item is stored in said cache; and monitoring, on said receiver, for said identified condition if said particular content item is accessed from said cache for display.

6. The method of claim 5 including identifying, by an info segment including a maximum length specifier, a maximum duration of a play of an advertisement, after which play of a content item should be resumed even if the advertisement has not completed play.

7. The method of claim 5 including overriding play of an advertisement by enabling an info segment resume indicator.

8. The method of claim 5 including preventing an advertisement from interrupting play of a content item according to an info segment ad type specifier, if the advertisement meets a predetermined criteria.

9. The method of claim 5 including permitting play of an advertisement to be skipped according to an info segment ad lock specifier, if a predetermined criteria is met.

10. The method of claim 9 including requiring play of an advertisement if said content is not owned by a user of the receiver and skipping said advertisement if said content was purchased by said user.

11. The method of claim 5 including identifying a location in said content to replace the display of the content with an advertisement based on a play specific factor.

12. The method of claim 11 wherein replacing the display of a particular content item with the display of an advertisement occurs only if said content is selected for play more than a predetermined number of times.

13. The computer-readable medium of claim 1 wherein said segment pointer is a universal resource locator.

14. The method of claim 5 including connecting said receiver to a presentation device by a wireless link.

* * * * *